United States Patent [19]
Wada et al.

[11] Patent Number: 6,125,827
[45] Date of Patent: Oct. 3, 2000

[54] AIR VENT APPARATUS FOR AUXILIARY FUEL TANK IN POWER UNIT

[75] Inventors: Tetsu Wada; Sadafumi Shidara, both of Wako, Japan

[73] Assignee: Honda Giken Kogyo Kabushiki Kaisha, Tokyo, Japan

[21] Appl. No.: 09/150,729

[22] Filed: Sep. 10, 1998

[30] Foreign Application Priority Data

Dec. 9, 1997 [JP] Japan ................................ 9-248100

[51] Int. Cl.⁷ ............................................... F02M 37/04
[52] U.S. Cl. ............................................................. 123/516
[58] Field of Search ............................ 123/516, 41.31, 123/195 P, 198 E; 440/900

[56] References Cited

U.S. PATENT DOCUMENTS

| | | | |
|---|---|---|---|
| 2,297,238 | 9/1942 | Neugebauer | 123/516 |
| 2,878,889 | 3/1959 | Gilbert | 123/516 |
| 4,416,108 | 11/1983 | Ghandhi | 123/516 |
| 5,046,976 | 9/1991 | Kobayashi | 123/195 P |
| 5,282,764 | 2/1994 | Glen | 123/195 P |
| 5,427,076 | 6/1995 | Kobayashi | 123/516 |
| 5,713,772 | 2/1998 | Takahashi | 123/195 P |
| 5,722,360 | 3/1998 | Tsunoda | 123/198 E |
| 5,803,054 | 9/1998 | Yamazaki | 123/516 |
| 5,855,197 | 1/1999 | Kato | 123/516 |

FOREIGN PATENT DOCUMENTS

4-295172  10/1992  Japan.

*Primary Examiner*—Carl S. Miller
*Attorney, Agent, or Firm*—Arent Fox Kintner Plotkin & Kahn PLLC

[57] ABSTRACT

In a power unit such as an outboard motor is provided in which an engine and an auxiliary fuel tank which temporarily stores fuel to be supplied to a fuel injection valve of the engine and to which extra fuel is returned from the injection valve, are housed in an engine room which is defined by a mount case and an engine cover, the upper ends of air vent pipes extend from the auxiliary fuel tank and communicate with an opening portion which opens in an upper outside surface of the engine cover. Fuel vapor occurring in the auxiliary fuel tank, is discharged from the opening portion. Accordingly, the fuel vapor occurring in the auxiliary fuel tank in the power unit is prevented from being sucked into the engine, and the degradation of the exhaust characteristics of the engine can be avoided.

5 Claims, 13 Drawing Sheets

AIR VENT APPARATUS FOR AUXILIARY FUEL TANK IN POWER UNIT

BACKGROUND OF THE INVENTION

1. Field of the Invention

The present invention relates to an air vent apparatus for an auxiliary fuel tank, which can ventilate the interior of the auxiliary fuel tank, in a power unit in which an engine room is defined by an engine support and an engine cover connected to the engine support. The engine room houses an engine mounted on the engine support and an auxiliary fuel tank which temporarily stores fuel to be supplied to a fuel injection valve of the engine and to which extra fuel is returned from the fuel injection valve.

2. Description of the Prior Art

In a conventional of an air vent apparatus for an auxiliary fuel tank, an air vent pipe extending from the auxiliary fuel tank opens into an intake system of an engine (refer to, for example, Japanese Patent Laid-Open No. 295172/1992) or is directly opened into an engine room.

The interior of the auxiliary fuel tank is heated to a high temperature and fuel vapor occurs in the auxiliary fuel tank, in part because the auxiliary fuel tank is adjacent to the engine and is easily exposed to the heat radiated from the engine and in part because extra fuel returning from the side of a fuel injection valve has a high temperature. In the case where the air vent pipe of the auxiliary fuel tank opens into the intake system of the engine, the fuel vapor occurring in the auxiliary fuel tank is mixed with air sucked from the engine room by the engine, whereas in the case where the air vent pipe opens into the engine room, the fuel vapor is sucked into the engine together with the air in the engine room. In either case, the air/fuel ratio of the mixture produced in the combustion chamber of the engine becomes high to some extent and may more or less degrade the exhaust characteristics of the engine.

SUMMARY OF THE INVENTION

The present invention has been made in view of the above-described problem, and an object of the present invention is to provide an air vent apparatus for an auxiliary fuel tank in a power unit, which is capable of preventing fuel vapor occurring in the auxiliary fuel tank from being sucked into the engine.

To achieve the above object, a first feature of the present invention is a power unit in which the engine room is defined by an engine support and an engine cover coupled to the engine support. The engine room houses an engine mounted on the engine support and an auxiliary fuel tank which temporarily stores fuel to be supplied to a fuel injection valve of the engine and to which extra fuel is returned from the fuel injection valve. The upper end of the air vent pipe means extending from the auxiliary fuel tank, communicates with an opening portion which opens to the outside of the engine room. In accordance with the first feature, it is possible to discharge fuel vapor which occurs in the auxiliary fuel tank, from the engine room through the air vent pipe. Accordingly, it is possible to prevent the fuel vapor from being sucked into the engine, thereby keeping normal the exhaust characteristics of the engine.

A second feature of the present invention is that the opening portion is opened in an upper outside surface of the engine cover. It is thus possible to promptly discharge from the engine room, the fuel vapor which occurs in the auxiliary fuel tank.

A third feature of the present invention is that the engine cover is detachably coupled to the engine support, and a first communication portion which is provided in the engine room and connected to the upper end of the air vent pipe means and a second communication portion communicating with the opening portion, the second communicating portion connected to and disconnected from the first communication portion in response to the attachment and the detachment of the engine cover to and from the engine support. The first and second communication portions can thus be connected to or disconnected from each other at the same time as the attachment or detachment of the engine cover, and the air vent pipes and the opening portion can communicate with or separate from each other without the need for special operations, whereby an easy-to-handle operation can be realized.

Further, a fourth feature of the present invention is that the engine is provided with a belt cover for housing the belt transmission and the first communication portion is formed in the belt cover. Since the belt cover is used for the formation of the first communication portion, an exclusive member for forming the first communication portion is not needed and the structure can be simplified.

Further, a fifth feature of the present invention is that there is provided a partitioning wall which divides the first communication portion into an air vent communication passage which communicates with the air vent pipe means and a ventilating communication passage which communicates with the inside of the belt cover.

Thus, the discharge of fuel vapor and ventilation of a belt chamber can be effected through the pair of first and second communication portions, and the structure can be simplified. In addition, the fuel vapor can be prevented from entering the belt chamber, by means of the partitioning wall.

The above and other objects, features and advantages of the present invention will become apparent from the following description of a preferred embodiment, taken in conjunction with the accompanying drawings.

BRIEF DESCRIPTION OF THE DRAWINGS

FIGS. 1 to 13 illustrate one embodiment in which the present invention is applied to an outboard motor.

DETAILED DESCRIPTION OF THE PREFERRED EMBODIMENT

Figure 1:
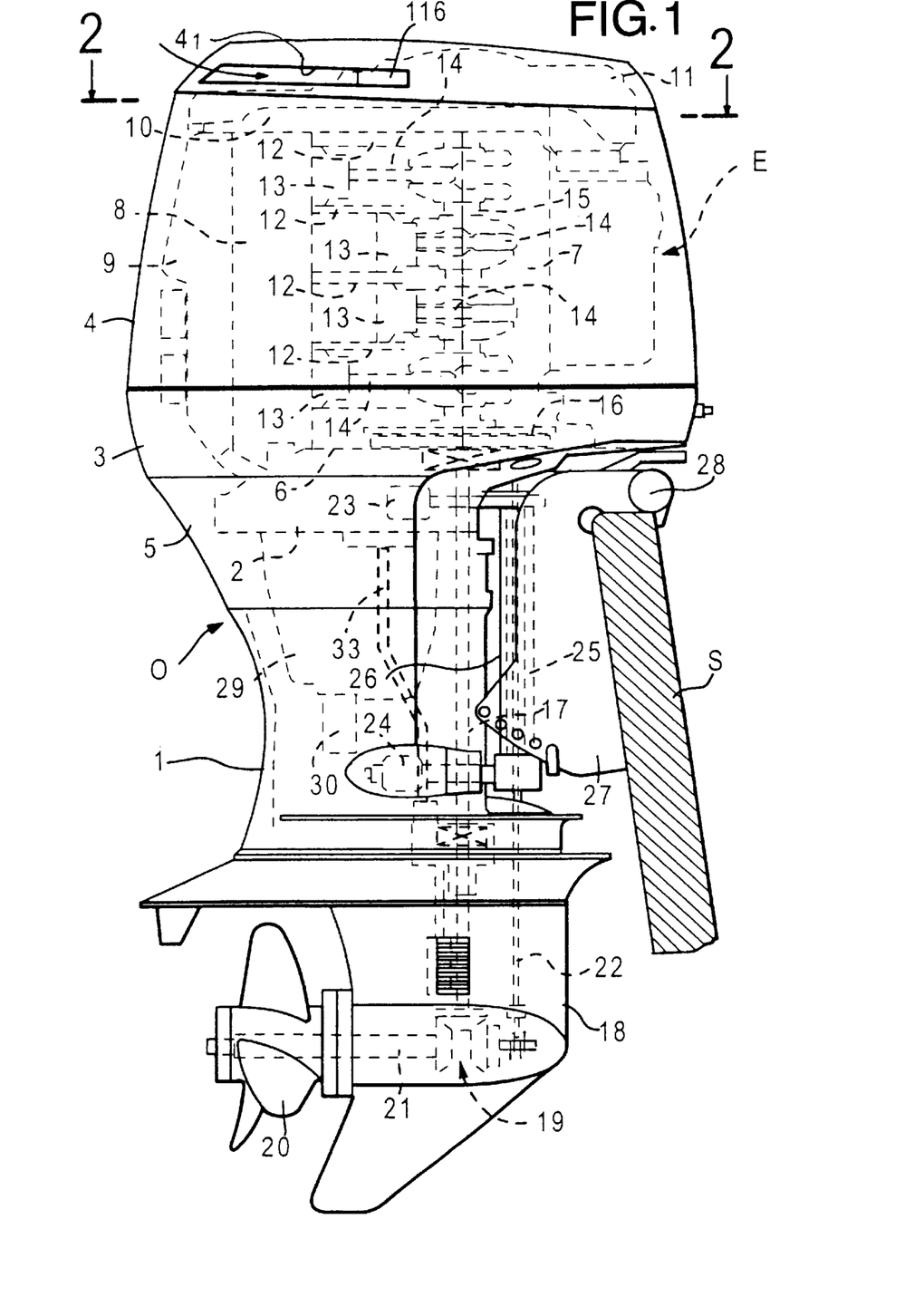
FIG. 1 is a side view of the entire outboard motor of the present invention.

Referring to FIG. 1, an outboard motor O which serves as a power unit is provided with a mount case 2 which serves as an engine support joined to an upper portion of an extension case 1, and a water-cooled in-line type four-cylinder and four-cycle engine E is supported on the top of the mount case 2 with a crankshaft 15 vertically arranged. An under case 3 having an open top is connected to the mount case 2, and an engine cover 4 is detachably mounted on an upper portion of the under case 3. An engine room 36 which houses the engine E is defined by the mount case 2, the under case 3 and the engine cover 4.

An under cover 5 is mounted between the lower edge of the under case 3 and an edge near the upper end of the extension case 1 so as to cover the outside of the mount case 2.

The engine E is provided with a cylinder block 6, a crankcase 7, a cylinder head 8, a head cover 9, a lower belt cover 10 and an upper belt cover 11. Lower surface of the cylinder block 6 and the crankcase 7 are supported on the upper surface of the mount case 2. Pistons 13 are slidably fitted in four cylinders 12 formed in the cylinder block 6, respectively, and the respective pistons are linked to a crankshaft 15 which is vertically arranged, via connecting rods 14.

A drive shaft 17 which is connected to a lower end of the crankshaft 15 together with a flywheel 16 extends downwardly through the interior of the extension case 1, and the lower end of the drive shaft 17 is connected to a propeller shaft 21 having a propeller 20 at its rear end, via a bevel gear mechanism 19 provided within a gear case 18. The lower end of a shift rod 22 for changing the rotating direction of the propeller shaft 21 is connected to a front portion of the bevel gear mechanism 19.

A swivel shaft 25 is fixed between an upper mount 23 provided on the mount case 2 and a lower mount 24 provided in the extension case 1, and a swivel case 26 which rotatably supports the swivel shaft 25, is supported for upward and downward oscillation with respect to a stern bracket 27 mounted on a stern S, via a tilt shaft 28.

An oil pan 29 and an exhaust pipe 30 are connected to a lower surface the mount case 2. Exhaust gas discharged from the exhaust pipe 30 into an internal space of the extension case 1 passes through an internal space of the gear case 18 and through the inside of a boss portion of the propeller 20 and is discharged underwater.

Figure 2:
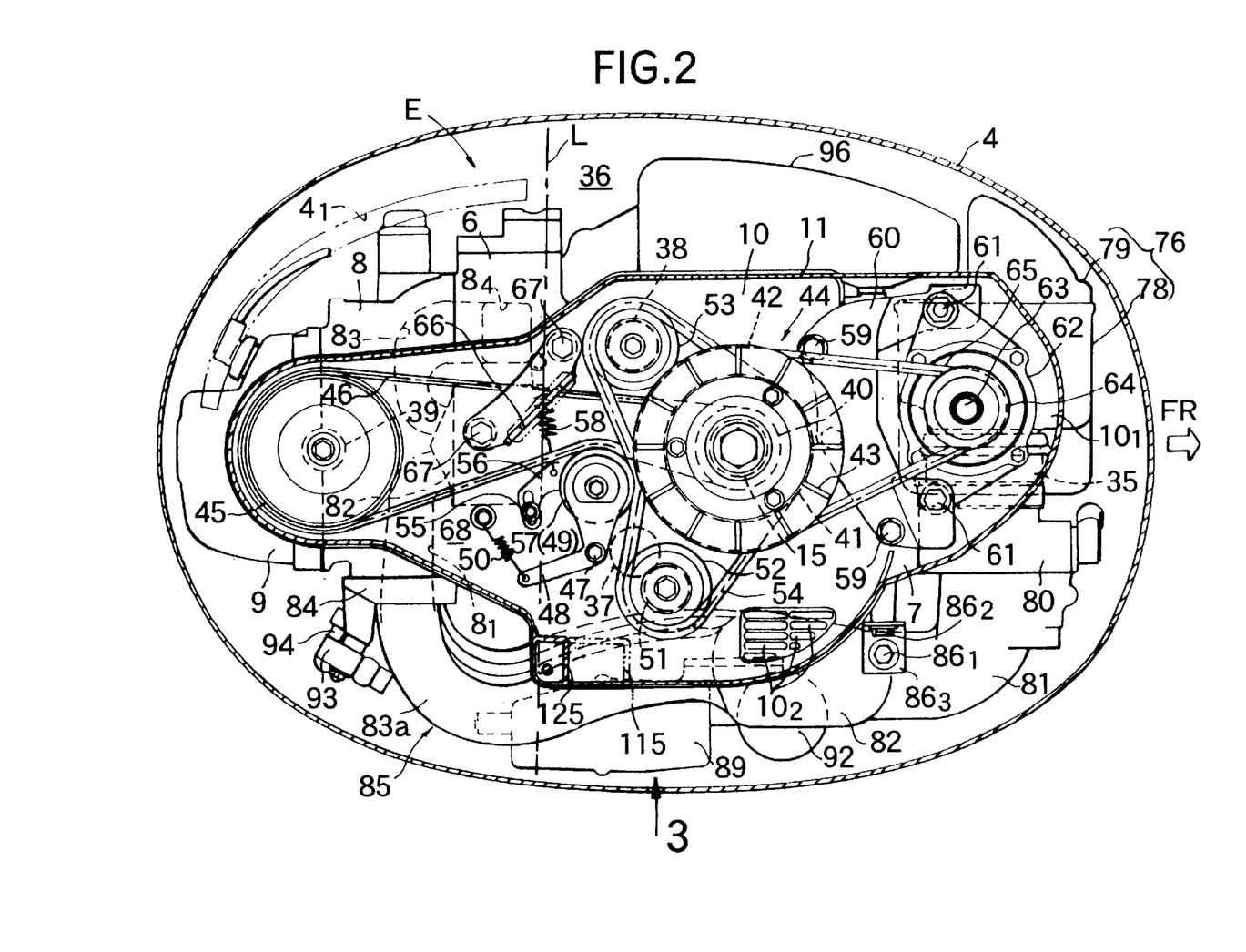
FIG. 2 is an enlarged cross-sectional view taken along a line 2—2 of FIG. 1.

As is apparent from FIG. 2, the engine E housed in the engine room 36 is provided with one camshaft 39 and two secondary balancer shafts 37 and 38 which are arranged in parallel with the crankshaft 15. The two secondary balancer shafts 37 and 38 are supported by the cylinder block 6 closer to the cylinder head 8 than the crankshaft 15, and the camshaft 39 is supported between the surfaces of contact between the cylinder head 8 and the head cover 9.

A pulley assembly 44 comprises a camshaft drive pulley 40, a secondary balancer shaft drive pulley 41, a generator drive pulley 42 and a cooling fan 43 which is fixed to the upper end of the crankshaft 15. A camshaft follower pulley 45 fixed to the upper end of the camshaft 39 and the camshaft drive pulley 40 are connected by an endless belt 46. The diameter of the camshaft drive pulley 40 is set to half of the diameter of the camshaft follower pulley 45 so that the camshaft 39 rotates at one half a speed of the crankshaft 15. A tension pulley 49 which is provided at one end of an arm 48 is pivotally supported by a pin 47 and is pressed against the outside surface of the endless belt 46 by the resilient force of a spring 50, whereby a predetermined tension is given to the endless belt 46.

A pair of secondary balancer shaft follower pulleys 52 and 53 are respectively fixed to an intermediate shaft 51 provided in the vicinity of the secondary balancer shaft 37 and to the secondary balancer shaft 38, and the pair of secondary balancer shaft follower pulleys 52 and 53 and the secondary balancer shaft drive pulley 41, are connected by an endless belt 54. A tension pulley 57 provided at one end of an arm 56 and pivotally supported by a pin 55, is pressed against the outside surface of the endless belt 54 by the resilient force of a spring 58, whereby a predetermined tension is given to the endless belt 54. The intermediate shaft 51 and the secondary balancer shaft 37 are connected by a pair of gears having the same diameter (not shown), and the diameter of the secondary balancer shaft drive pulley 41 is set to two times the diameter of each of the secondary balancer shaft follower pulleys 52 and 53 so that the pair of secondary balancer shafts 37 and 38 rotate in directions opposite to each other and at a speed which is two times the speed of the crankshaft 15.

A generator 62 is supported by two bolts 61, 61 on a bracket 60 which is fixed to an upper surface of the crankcase 7 by two bolts 59, 59. A generator follower pulley 64 fixed to a rotating shaft 63 of the generator 62, and the generator drive pulley 42 are connected by an endless belt 65, and the generator 62 is driven by the crankshaft 15. Since the generator 62 is provided separately from the engine E in this manner, a general-purpose generator which is advantageous in terms of cost, can be used as the generator 62, as compared with the situation in which a generator is incorporated in a flywheel provided on the crankshaft 15, and, in addition, it is also possible to readily increase the capacity of the generator 62.

The three belts 46, 54 and 65 which drive the camshaft 39, the two secondary balancer shafts 37 and 38 and the generator 62 are housed in a belt chamber 68 defined by the lower belt cover 10 and the upper belt cover 11. The lower belt cover 10 is provided with an opening portion $10_1$ which surrounds the periphery of the generator 62 and a plurality of slits $10_2$ in its bottom wall on the right side of the crankshaft 15. Air is introduced into the belt chamber 68 via the opening portion 101 and the slits $10_2$.

Figure 3:
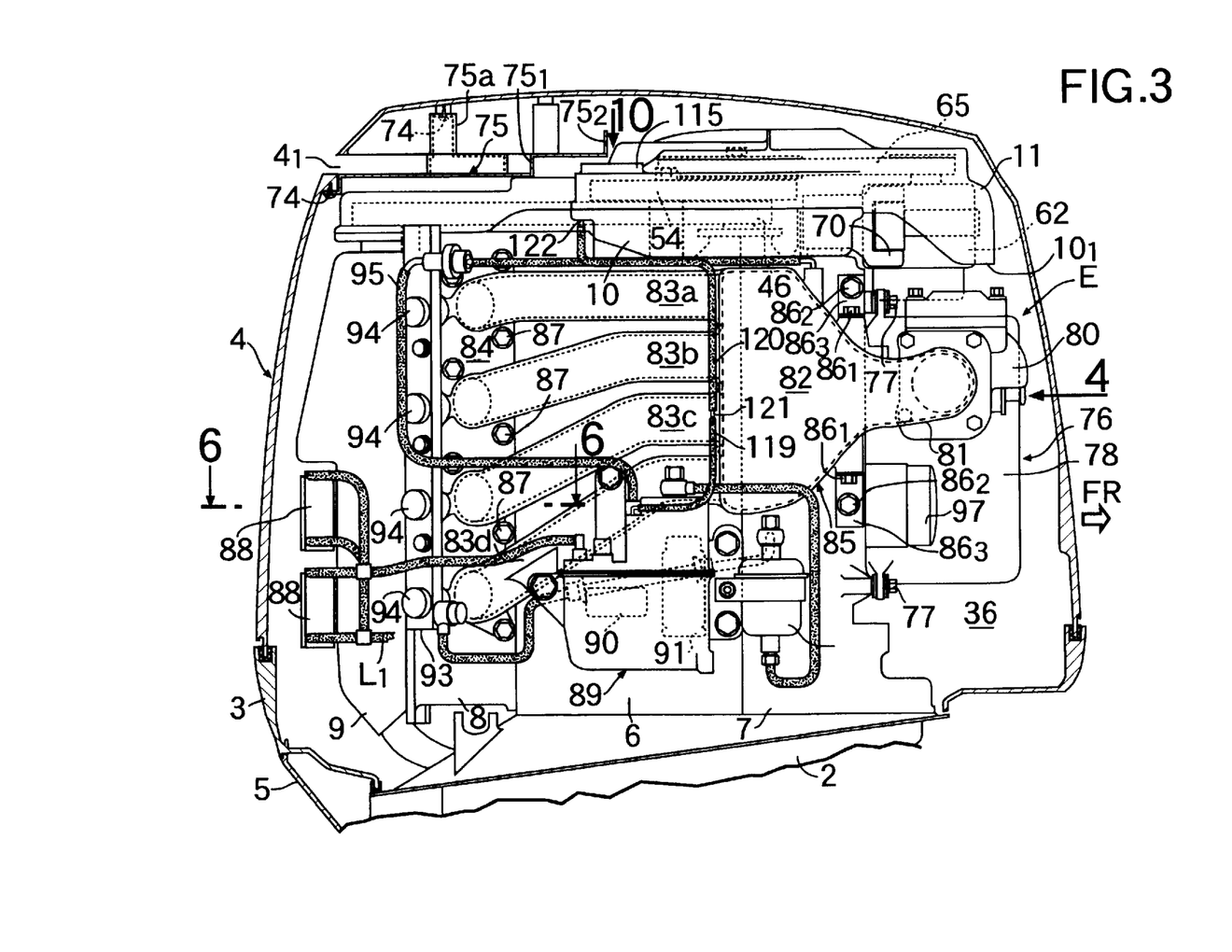
FIG. 3 is a view taken in the direction of an arrow 3 of FIG. 2.
Figure 4:
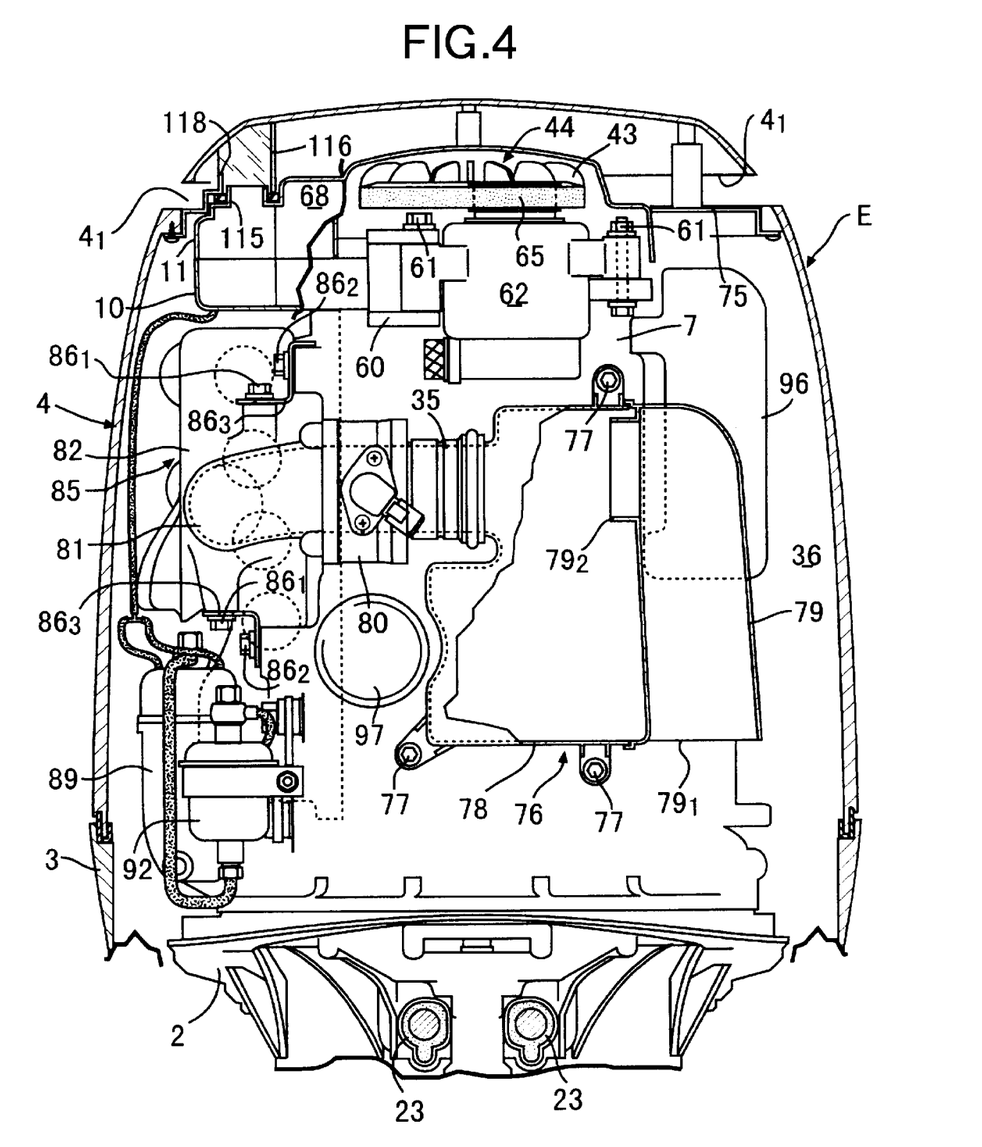
FIG. 4 is a view taken in the direction of an arrow 4 of FIG. 3.

As is apparent from FIGS. 2 to 4, a pair of right and left slit-like rear opening portions $4_1$, $4_1$ are formed in the upper rear surface of the engine cover 4, and a guide plate 75, which extends forwardly from the lower edges of the rear opening portions $4_1$, $4_1$ and whose front end terminates in a middle portion between the front and rear sides of the engine room 36, is fixed to the internal surface of the engine cover 4. In this fixation, a rear edge portion and a middle boss 75a of the guide plate 75 are respectively fixed to the internal surface of the engine cover 4 by tapping screws 73 and a tapping screw 74. The guide plate 75 is formed with two water resisting steps $75_1$ and $75_2$ which are raised in a staircase-like shape from the rear opening portion $4_1$ toward the engine room 36.

Air which is sucked from the rear opening portions $4_1$, $4_1$ passes forwardly through the space between the upper wall of the engine cover 4 and the guide plate 75, and flows up the two water resisting steps $75_1$, $75_2$. During flowing up, splashes of water in the air are prevented from entering by the water resisting steps $75_1$, $75_2$, and only the air is allowed to flow into the engine room 36 through the water resisting steps $75_1$, $75_2$. The air is supplied to the intake of the engine E or serves to cool various portions of the engine.

As shown in FIGS. 3 and 10 to 13, a rectangle-shaped, first communication port (a first communication portion) 115 which communicates with the belt chamber 68, is projectingly formed on an upper surface of the upper belt cover 11, and a urethane foam sealing member 117 is fitted in the upper periphery of the opening portion of the first communication port 115. A rectangle shaped, second communication port (second communication portion) 116 which extends vertically and abuts on the internal surface of the engine cover 4 at its upper end, is formed in a right portion of the guide plate 75, and a notch 118 which communicates with the rear opening portion $4_1$ of the engine cover 4 via an upward step 72, is provided in the rear wall of the second communication port 116. When the engine cover 4 is attached to the under case 3, the first and second communication ports 115 and 116 are joined to each other with the sealing member 117 interposed therebetween, and when the engine cover 4 is detached from the under case 3, the first and second communication ports 115 and 116 are separated from each other.

Air which is introduced into the belt chamber 68 via the opening portion 101 and the slits 102, passes through a ventilating communication passage 123 (to be described later) in the first communication port 115, the second communication port 116 and the notch 118, and is discharged from the rear opening portion $4_1$, whereby the ventilation of the belt chamber 68 can be carried out. During this time, since the notch 118 of the second communication port 116 occupies a position above the rear opening portion $4_1$, splashes which reach the rear opening portion $4_1$ are prevented from entering the second communication port 116.

The structure of the intake system of the engine E will be described with reference to FIGS. 2 to 5A–5D.

An intake silencer 76 is fixed to the front surface of the crankcase 7 by three bolts 77. The intake silencer 76 includes a box-shaped body portion 78 and a duct portion 79 connected to the left side of the body portion 78. The duct portion 79 at its lower end, is provided with an intake opening $79_1$ which opens downwardly, and at its upper end is provided with a communication port $79_2$ which communicates with the internal space of the body portion 78. A throttle body 80 which is positioned on the right side of the body portion 78 of the intake silencer 76, is connected to the body portion 78 via a short intake duct 35 having flexibility.

The throttle body 80 is fixedly connected to an intake manifold 85, which will be described below. The intake manifold 85 is integrally provided with an elbow 81, a surge tank 82, four intake pipes 83a, 83b, 83c and 83d and a mounting flange 84, and extends along the right side of the engine E. The elbow 81 serves to change the flow of intake air by approximately 90° from a flow along the front side of the crankcase 7 to a flow along the right side of the crankcase 7, and may also be a flexible duct. In the present embodiment, the elbow 81 is integral with the surge tank 82, the intake pipes 83a, 83b, 83c and 83d and the mounting flange 84 so that the throttle body 80 is fixedly supported.

The connection portion between the elbow 81 and the surge tank 82 of the intake manifold 85, is formed to have a dimensional shape which is vertically smaller than the top and the bottom of the surge tank 82. This portion is fixed to the right wall of the crankcase 7 by bolts $86_1$, $86_1$; $86_2$, $86_2$ and two brackets $86_3$, $86_3$ each having loose holes. The mounting flange 84 is fixed to an intake manifold mounting surface $8_1$ formed on the right side of the cylinder head 8 by a plurality of bolts 87.

As shown in FIG. 3, the first intake pipe 83a which is the first intake pipe from the top extends approximately horizontally along the lower surface of the lower belt cover 10, and the second to fourth intake pipes 83b to 83d which are the second to fourth intake pipes from the top, are arranged to incline upwardly from the mounting flange 84 toward the surge tank 82. Regarding their angles of inclination, the fourth intake pipe 83d has the largest, the third intake pipe 83c is the medium, and the second intake pipe 83b has the smallest. Since the intake pipes 83b, 83c and 83d are arranged in this inclined manner, fuel which has been blown back from injection valves 94 (to be described later) into the respective intake pipes 83b, 83c and 83d can be promptly returned to the respective cylinders 12 by gravity, and further, a space can be ensured below the surge tank 82 and the fourth intake pipe 83d so that high-pressure fuel supply means which will be described later, can be arranged in the space.

The pipe lengths of the intake pipes 83a, 83b, 83c and 83d have great influence on the output of the engine E owing to the pulsation effect of the intake system, but if the angles of inclination of the intake pipes 83a, 83b, 83c and 83d are made different in the above-described manner, the pipe length of the horizontal first intake pipe 83a becomes the shortest and the pipe length of the fourth intake pipe 83d having the largest angle of inclination becomes the longest. For this reason, in the present embodiment, as shown in FIGS. 4 and 5, the position of a connection portion at which the upstream end of each of the four intake pipes 83a, 83b, 83c and 83d is connected to the surge tank 82, is deviated from the intake manifold mounting surface $8_1$ of the cylinder head 8 to which the mounting flange 84 at the downstream end is fixed, thereby compensating for the differences between the pipe lengths. Specifically, the deviations Da to Dd of the respective first to fourth intake pipes 83a to 83d from the intake manifold mounting surface $8_1$ are set so that an intake pipe having a smaller angle of inclination shows a larger deviation, that is, Da>Db>Dc>Dd.

Figure 5A:
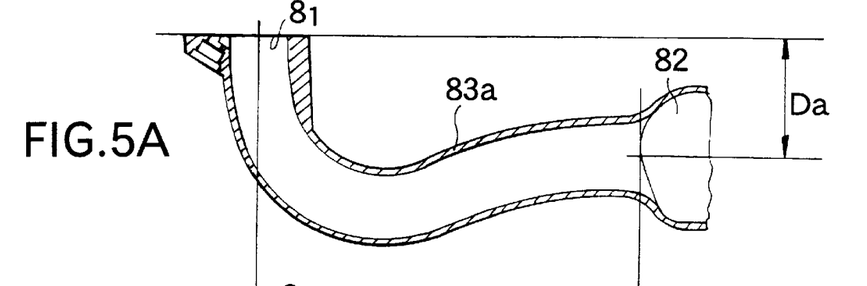
FIGS. 5A–5D are views showing the shape of each intake pipe.
Figure 5B:
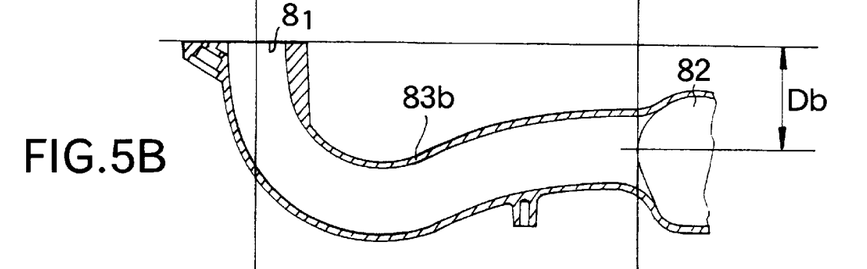
Figure 5C:
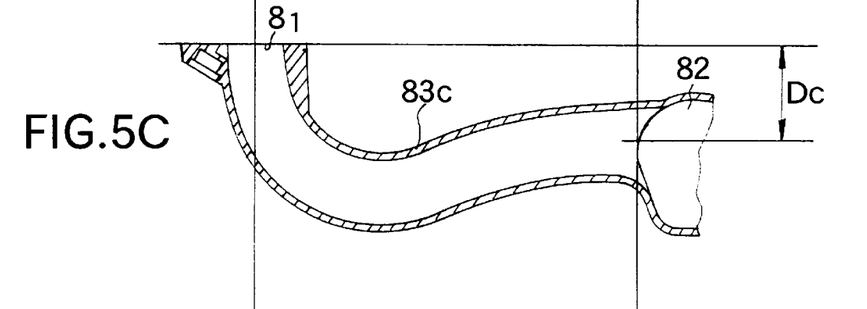
Figure 5D:
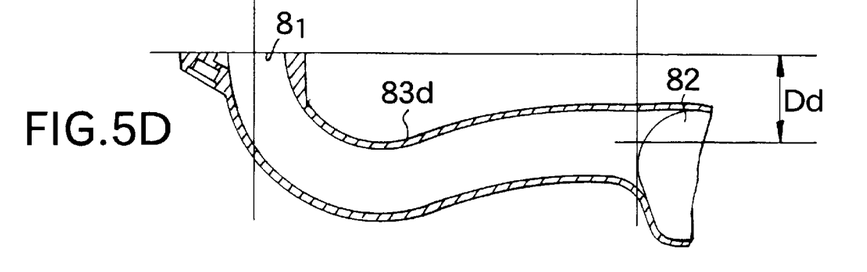

Accordingly, the pipe length of the first intake pipe 83a shown in FIG. 5A has the amount of decrease in the pipe length due to its horizontal arrangement compensated for by the large deviation Da, and the pipe length of the fourth intake pipe 83d shown in FIG. 5D has the amount of increase in the pipe length due to its greatly inclined arrangement, compensated for by the small deviation Dd, whereby the pipe lengths of the four intake pipes 83a, 83b, 83c and 83d can be made approximately equal. By eliminating the differences between the pipe lengths of the four intake pipes 83a, 83b, 83c in this manner, it is possible to prevent an output decrease in the engine E.

The structure of a fuel supply system for the engine E will be described with reference to FIGS. 2 to 4 and 7 to 9.

Figure 6:
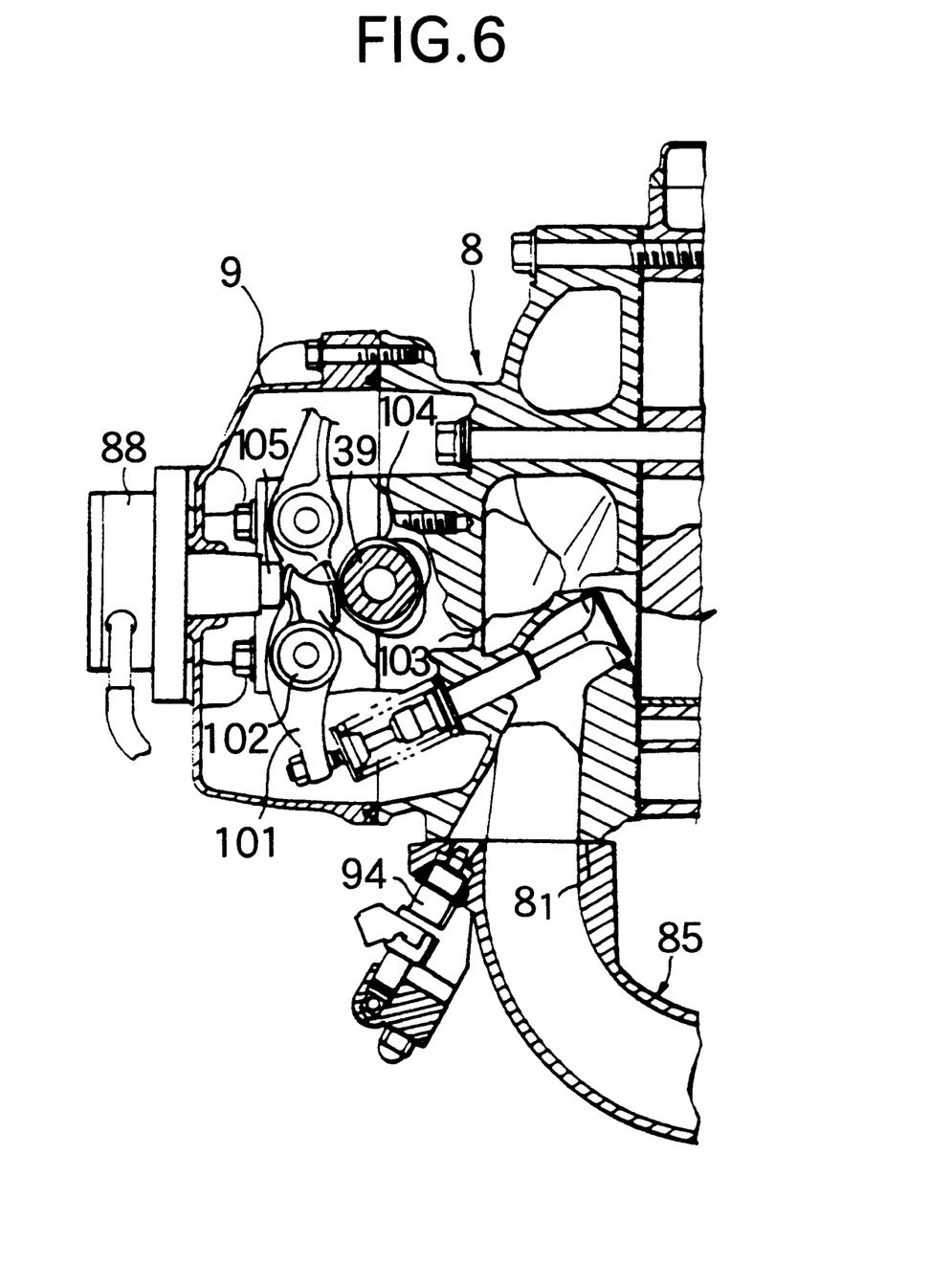
FIG. 6 is a cross-sectional view taken along a line 6—6 of FIG. 3.

Two low-pressure fuel pumps 88 each of which is a plunger pump, are provided in parallel on the rear side of the head cover 9, and fuel sucked via a fuel supply pipe $L_1$ from a main fuel tank (not shown) which is installed in the boat, is supplied via a fuel supply pipe $L_2$ to an auxiliary fuel tank 89 provided on the right side of the cylinder block 6. As is apparent from FIG. 6, a pump driving rocker arm 103 is coaxially supported by an intake rocker arm 102 which supports an intake rocker arm 101. One end of the pump driving rocker arm 103 is engaged with a pump cam 104 provided on the camshaft 39, while the other end is engaged with a plunger 105 of each of the low-pressure fuel pumps 88. Thus, the low-pressure fuel pumps 88 are driven by the camshaft 39.

Figure 7:
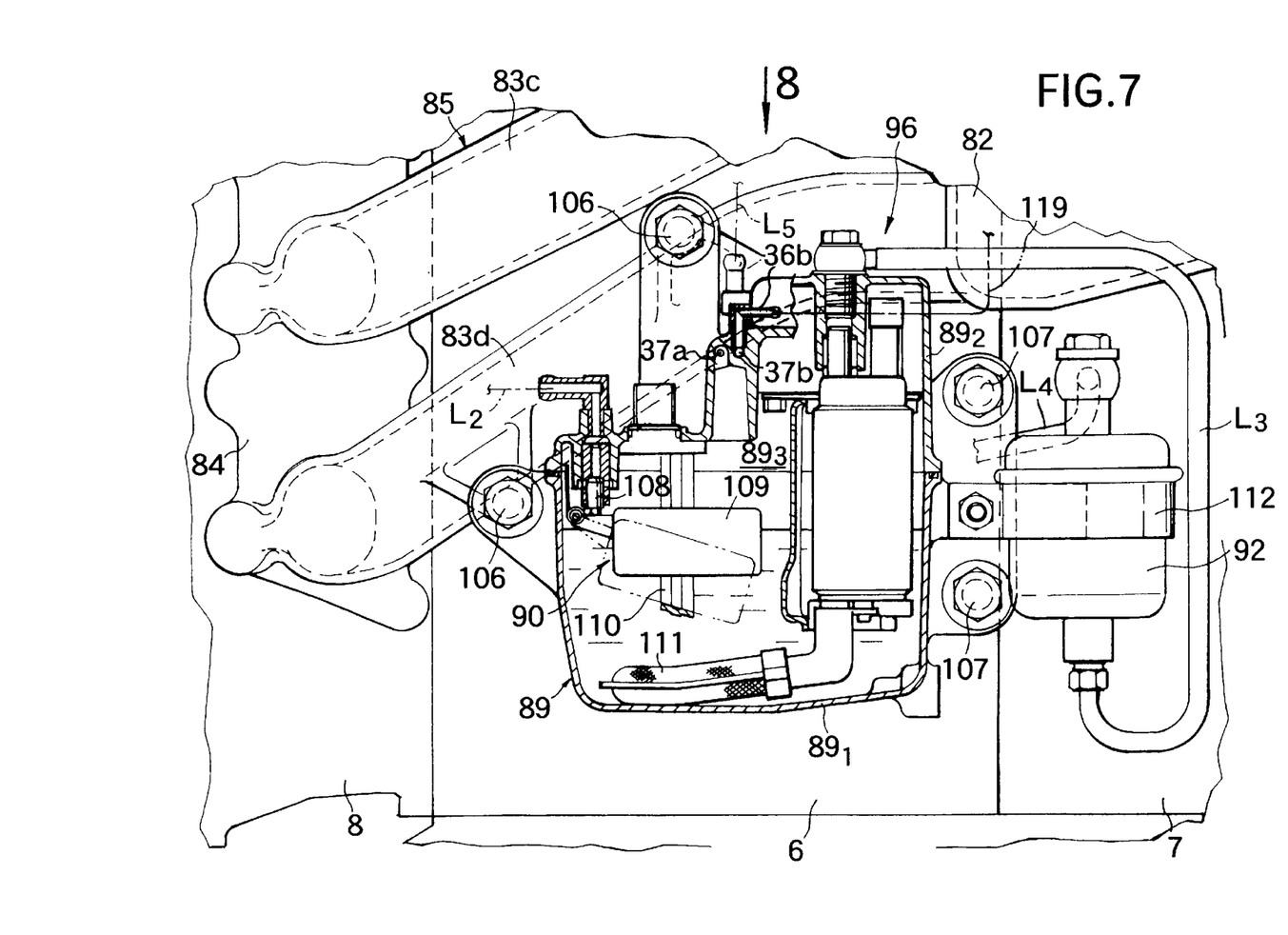
FIG. 7 is an enlarged cross-sectional view showing an essential portion of FIG. 3.
Figure 8:
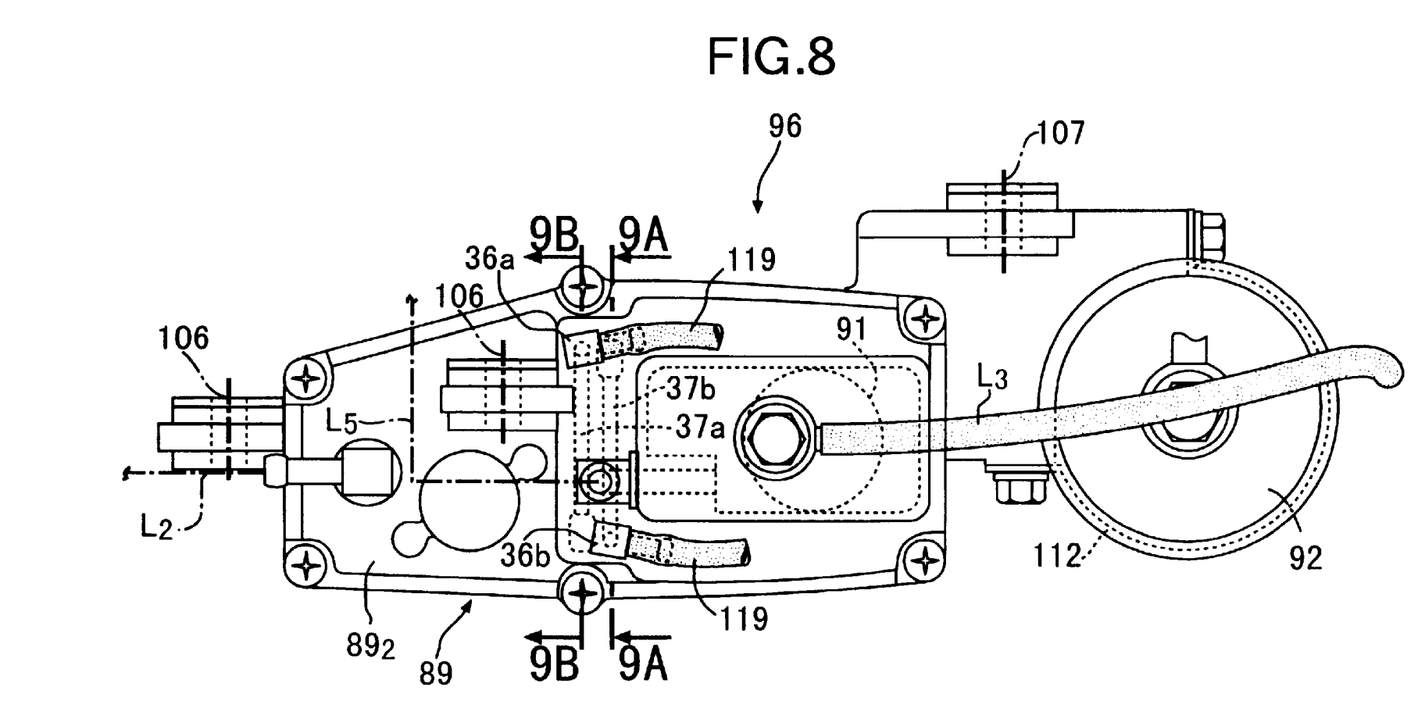
FIG. 8 is a view taken in the direction of an arrow 8 of FIG. 7.

As is apparent from FIGS. 3, 7 and 8, the auxiliary fuel tank 89 is divided into a lower-side body portion $89_1$ and an upper-side cap $89_2$. The body portion $89_1$ is fixed to two boss portions formed on the fourth intake pipe 83d, by bolts 106 and is also fixed to the cylinder block 6 by two bolts 107. A float valve 90 which regulates the level of fuel, and a high-pressure fuel, pump 91 which is a solenoid valve, are housed in the interior of the auxiliary fuel tank 89.

The float valve 90 includes an opening/closing valve 108 which is provided in a portion where the fuel supply pipe $L_2$ extending from the low-pressure fuel pumps 88, 88 is connected to the auxiliary fuel tank 89, a float 109 which rises or falls according to the level of fuel to open or close the opening/closing valve 108, and a guide member 110 which guides the rise or fall of the float 109. If the fuel level falls below a predetermined level, the opening/closing valve 108 opens to introduce fuel from the low-pressure fuel pumps 88, 88 into the auxiliary fuel tank 89, and if the fuel level rises above the predetermined level, the opening/closing valve 108 closes to shut off the supply of fuel from the low-pressure fuel pumps 88.

The high-pressure fuel pump 91 is vertically arranged, and pumps fuel, which is sucked through a strainer 111 extending along the bottom wall of the auxiliary fuel tank 89, into a high-pressure filter 92 via a fuel supply pipe $L_3$. The high-pressure filter 92 is fixed to the front side of the auxiliary fuel tank 89 by a band 112.

A fuel rail 93 is fixed to the mounting flange 84 of the intake manifold 85 by a plurality of bolts 113, and the four injection valves 94 which correspond to the four cylinders 12, are fixed to the mounting flange 84. Fuel supplied from the high-pressure filter 92 to the lower end of the fuel rail 93 via a fuel supply pipe $L_4$, is distributed among the four injection valves 94. A regulator 95 provided at the upper end of the fuel rail 93 regulates the pressure of the fuel supplied to the injection valves 94, and returns extra fuel to the auxiliary fuel tank 89 via a fuel supply pipe $L_5$. The regulator 95 and the surge tank 82 are connected via a negative-pressure pipe $L_6$ so as to regulate the set pressure of the regulator 95.

A high-pressure fuel supply means 96 is comprised of the auxiliary fuel tank 89, the high-pressure fuel pump 91, the high-pressure filter 92, the fuel rail 93 and the regulator 95.

Figure 9A:
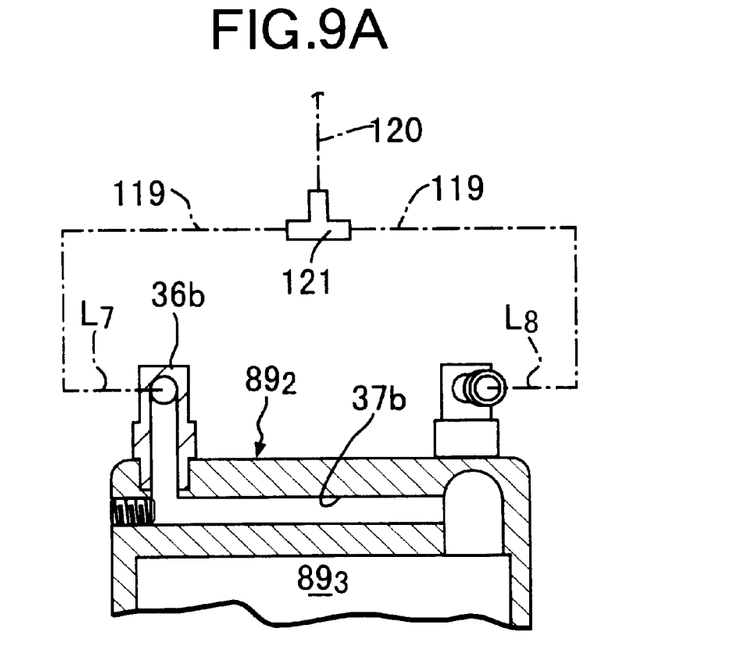
FIG. 9A is a cross-sectional view taken along a line 9A—9A of FIG. 8.
Figure 9B:
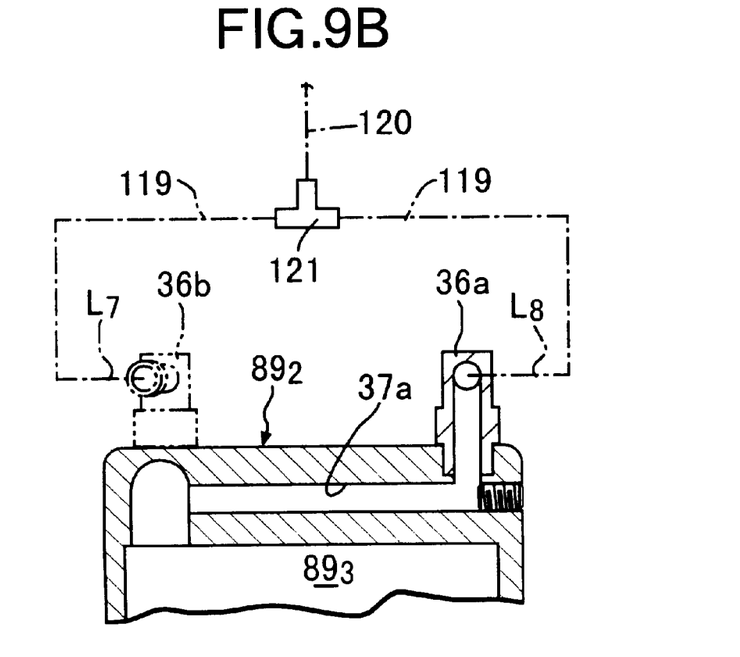
FIG. 9B is a cross-sectional view taken along a line 9B—9B of FIG. 8.
Figure 10:
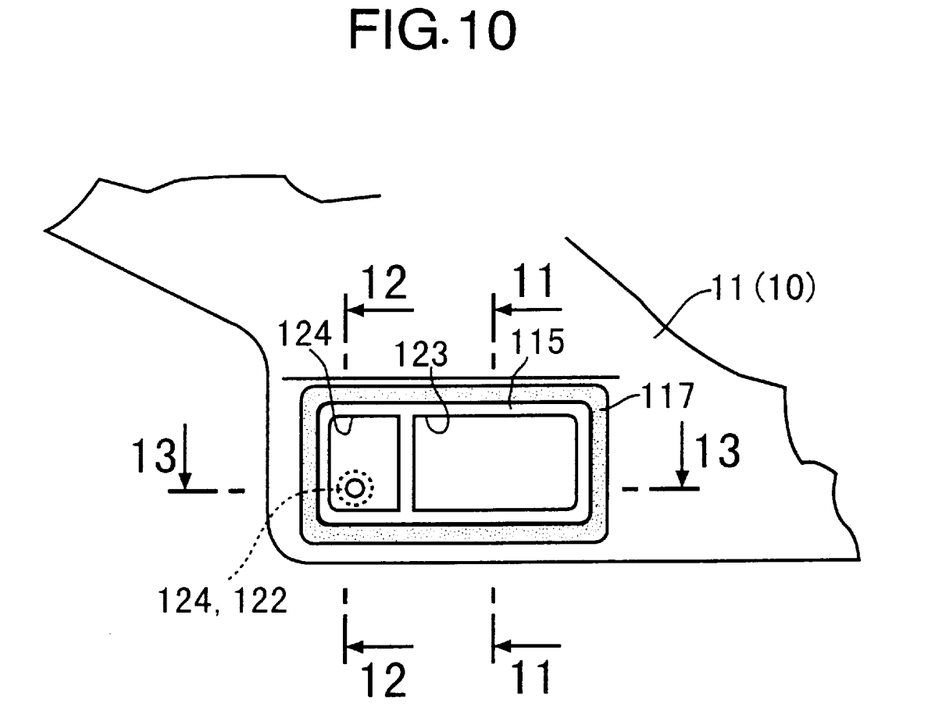
FIG. 10 is a view taken in the direction of an arrow 10 of FIG. 3.
Figure 11:
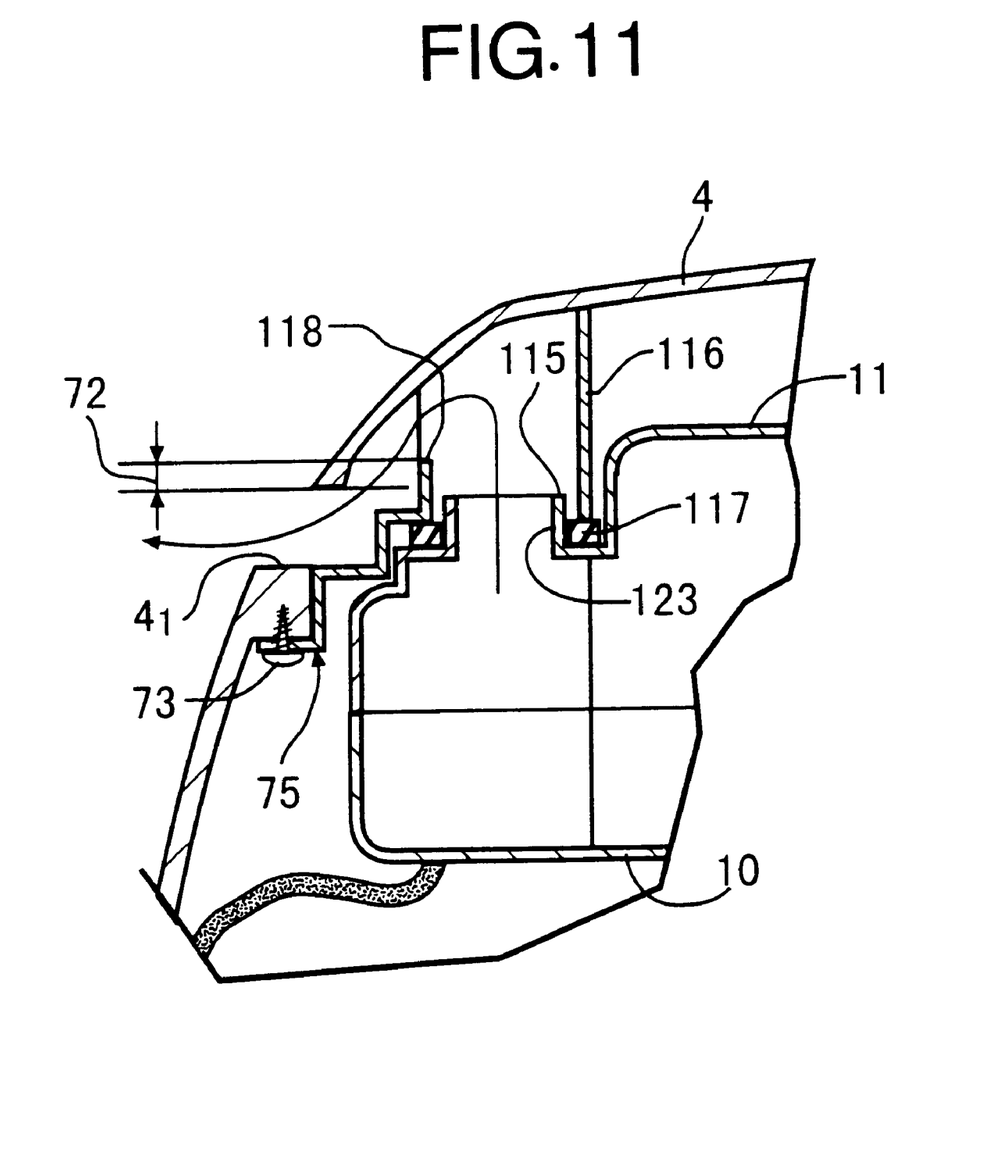
FIG. 11 is a cross-sectional view taken along a line 11—11 of FIG. 10.
Figure 12:
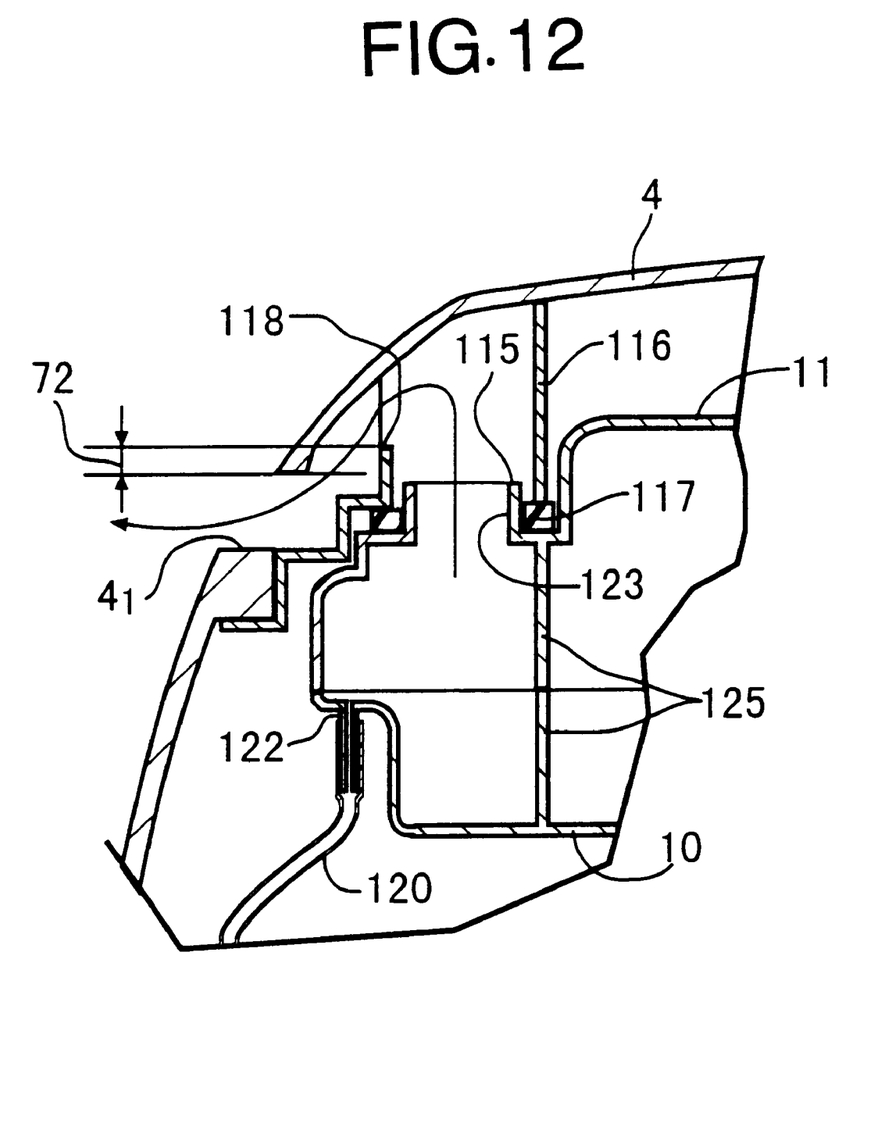
FIG. 12 is a cross-sectional view taken along a line 12—12 of FIG. 10.
Figure 13:
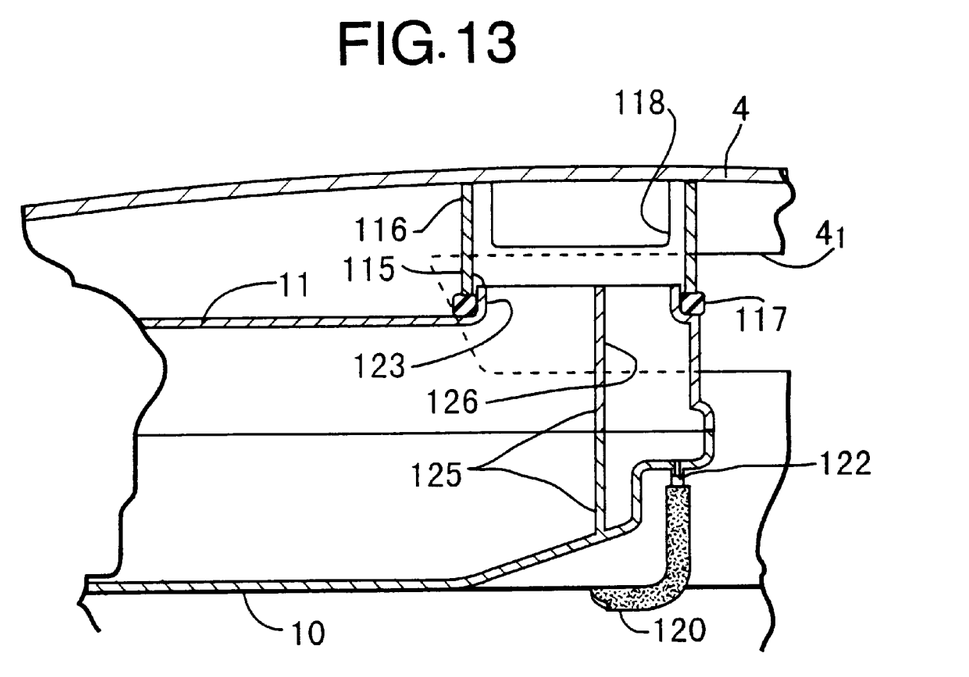
FIG. 13 is a cross-sectional view taken along a line 13—13 of FIG. 10.

As is apparent from FIGS. 7 to 9, a pair of couplers 36a and 36b which are laterally separated from each other, are provided on the upper surface of the cap $89_2$ of the auxiliary fuel tank 89, in the middle portion between the front and the rear of the cap $89_2$. The coupler 36a communicates with an upper space $89_3$ of the auxiliary fuel tank 89 via an L-shaped air vent passage 37a which extends in the upper wall of the cap $89_2$ in one direction, while the coupler 36b communicates with the upper space $89_3$ of the auxiliary fuel tank 89 via an L-shaped air vent passage 37b which extends in the upper wall of the cap $89_2$ in the opposite direction. That is to say, one pair of air vent passages 37a and 37b are arranged to cross each other.

Two lower air vent pipes 119, 119 are respectively connected to the above-described one pair of couplers 36a and 36b, and one upper air vent pipe 120 is connected to the air vent pipes 119 via a T-shaped joint 121. The upper end of the upper air vent pipe 120 is connected to a coupler 122 projecting from the lower side of the lower belt cover 10. As shown in FIGS. 10 to 13, the upper and lower belt covers 11 and 10 are formed with a partitioning wall 125 which partitions the first communication port 115 into a ventilating communication passage 123 which communicates with the belt chamber 68 and an air vent communication passage 124 which communicates with the coupler 122.

Ventilation can be effected between the auxiliary fuel tank 89 and the rear opening portion $4_1$ through the air vent passages 37a and 37b, the lower air vent pipes 119, the upper air vent pipe 120, the air vent communication passage 124 and the second communication port 116 according to an increase or decrease in the fuel stored in the auxiliary fuel tank 89. Accordingly, the interior of the auxiliary fuel tank 89 can be maintained at approximately atmospheric pressure at all times so that fuel can be smoothly supplied to the injection valves 94. If fuel vapor occurs in the auxiliary fuel tank 89 owing to the fact that, for example, the auxiliary fuel tank 89 is exposed to heat radiated from the engine E or high-temperature extra fuel returns from the regulator 95 to the auxiliary fuel tank 89, the fuel vapor sequentially rises in the air vent passages 37a and 37b, the lower air vent pipes 119, 119 the upper air vent pipe 120, the air vent communication passage 124 and the second communication port 116 and is smoothly discharged to the outside through the notch 118 of the second communication port 116 and the rear opening portion $4_1$ of the upper portion of the engine cover 4.

Thus, the fuel vapor is prevented from being sucked into the engine E and therefore the degradation of the exhaust characteristics of the engine E can be avoided. In addition, since the air vent communication passage 124 through which the fuel vapor passes, is separated from the ventilating communication passage 123 in the first communication port 115 by the partitioning wall 125, the fuel vapor can also be prevented from flowing into the belt chamber 68.

Furthermore, since the ventilating communication passage 123 and the air vent communication passage 124 are formed in the common first communication port 115 so that the passages 123 and 124 communicate with the second communication port 116 at the same time that the engine cover 4 is mounted, one communication portion suffices and one sealing member 117 suffices to seal the communication portion, whereby the entire structure can be simplified.

If the outboard motor O detached from the boat, is stored in the state of lying on its side, the level of the fuel remaining in the auxiliary fuel tank 89 changes in a direction perpendicular to the direction of the normal level, but even if either one of the open ends of the air vent passages 37a and 37b sinks into the fuel, the other one is always exposed above the level of the fuel. Accordingly, even if the internal pressure of the auxiliary fuel tank 89 rises due to a temperature variation, the pressure can be discharged from the rear opening portion $49_1$ through the air vent passage 37a or 37b which have an open end exposed above the level of the fuel and either one of air vent pipes $L_7$ and $L_8$ or the like which communicate with the respective air vent passages 37b and 37a. In addition, since the pair of air vent passages 37a and 37b are formed to cross each other, even if one end of each of the air vent passages 37a and 37b sinks into the fuel, the other end is exposed above the level of the fuel, whereby the outflow of the fuel due to gravity can be prevented.

Furthermore, since the air vent passages 37a and 37b are provided in an approximately central portion between the front and the rear of the auxiliary fuel tank 89, even if the outboard motor O tilts during running in shallows, the open ends of the air vent passages 37a and 37b do not sink into the fuel.

In the assembly of the engine E, if a subassembly is used in which the high-pressure fuel supply means 96 is previously secured to the intake manifold 85, it is possible to reduce the number of assembling steps and improve workability. Specifically, the auxiliary fuel tank 89 in which the float valve 90 and the high-pressure fuel pump 91 are incorporated is fixed by the two bolts 106 to the third intake pipe 83c and the fourth intake pipe 83d of the intake manifold 85 having the mounting flange 84 on which the injection valves 94 are mounted, and the high-pressure filter 92 is fixed to the auxiliary fuel tank 89 by means of the band 112. The fuel rail 93 to which the four injection valves 94 are connected, is fixed to the mounting flange 84 of the intake manifold 85 by the bolts 113, and the regulator 95 is fixed to the fuel rail 93.

Then, one end of the fuel supply pipe $L_2$ is connected to the float valve 90 of the auxiliary fuel tank 89, the high-pressure fuel pump 91 of the auxiliary fuel tank 89 and the high pressure filter 92 are connected by the fuel supply pipe $L_3$, the high pressure filter 92 and the lower end of the fuel rail 93 are connected by the fuel supply pipe $L_4$, and the regulator 95 and the auxiliary fuel tank 89 are connected by the fuel return pipe $L_5$. Further the regulator 95 and the surge tank 82 are connected by the negative-pressure pipe $L_6$. Thus, if a subassembly is used in which the high-pressure fuel supply means 96 is mounted on the intake manifold 85, it is possible to complete the assembly of the engine E merely by connecting the other end of the fuel supply pipe $L_2$ to the low-pressure fuel pumps 88, 88 after fixing the intake manifold 85 to the cylinder head 8 by means of the plurality of bolts 87 and fixing the auxiliary fuel tank 89 to the cylinder block 6 by means of the two bolts 107, 107. In this manner, by preparing the subassembly in which the high-pressure fuel supply means 96 is mounted on the intake manifold 85, it is possible to greatly reduce the man hours for assembly.

The above described embodiment may be modified wherein the second communication port 116 can be formed in the engine cover 4 separately from the guide plate 75, and the rear opening portions $4_1$ of the engine cover 4 can also be separated into an intake opening for the engine E and an air vent opening for the auxiliary fuel tank 89. Although the embodiment of the present invention has been described above in detail, various design changes can be made without departing from the scope and spirit of the present invention.

We claim:

1. An air vent apparatus of an auxiliary fuel tank in a power unit having an engine room comprising:

an engine support and an engine cover coupled to said engine support, wherein said engine room houses an engine mounted on said engine support, said engine having a fuel injection valve, said auxiliary fuel tank for temporarily storing fuel to be supplied to the fuel injection valve of said engine and for receiving extra fuel from the fuel injection valve; and air vent pipe means for venting fuel vapor fed from the auxiliary fuel tank to be released to outside of the engine room, the air vent pipe means extending from said auxiliary fuel tank to an upper end of said engine room that communicates with an opening portion of the engine cover which opens to the outside of said engine room.

2. An air vent apparatus for an auxiliary fuel tank in a power unit according to claim 1, wherein said opening portion opens in an upper outside surface of said engine cover.

3. An air vent apparatus for an auxiliary fuel tank in a power unit according to claim 2, wherein said engine cover is detachably coupled to said engine support, and wherein said engine cover includes a first communication portion which is provided in said engine room and connected to the upper end of said air vent pipe means and a second communication portion communicating with said opening portion, said second communicating portion connected to and disconnected from said first communication portion in response to the attachment and the detachment of said engine cover to and from said engine support.

4. An air vent apparatus for an auxiliary fuel tank in a power unit according to claim 3, including a belt transmission above said engine room and wherein said belt transmission includes a belt cover for housing said belt transmission, and said first communication portion is formed in said belt cover.

5. An air vent apparatus for an auxiliary fuel tank in a power unit according to claim 4, further comprising a partitioning wall for dividing said first communication portion into an air vent communication passage for communicating with said air vent pipe means and a ventilating communication passage for communicating with the inside of said belt cover.

* * * * *

UNITED STATES PATENT AND TRADEMARK OFFICE
CERTIFICATE OF CORRECTION

PATENT NO. : 6,125,827
DATED : October 3, 2000
INVENTOR(S) : Tetsu Wada and Sadafumi Shidara It is certified that error appears in the above-identified patent and that said Letters Patent is hereby corrected as shown below:

Title page,
Item [30] Foreign Application Priority Data, "Dec. 9, 1997" should be
-- Sep. 12, 1997 --.

Signed and Sealed this

Sixteenth Day of October, 2001

Attest:

*Nicholas P. Godici*

NICHOLAS P. GODICI
*Attesting Officer*    *Acting Director of the United States Patent and Trademark Office*